United States Patent [19]
Whitledge

[11] Patent Number: 4,937,670
[45] Date of Patent: Jun. 26, 1990

[54] PEAK DETECTOR WITH FEEDBACK

[75] Inventor: Gary A. Whitledge, Lawrenceville, Ga.

[73] Assignee: RCA Licensing Corporation, Princeton, N.J.

[21] Appl. No.: 380,697

[22] Filed: Jul. 14, 1989

Related U.S. Application Data

[63] Continuation-in-part of Ser. No. 304,299, Jan. 31, 1989, abandoned.

[51] Int. Cl.$^5$ .............................................. H04N 5/14
[52] U.S. Cl. .................................... 358/160; 358/169; 307/354
[58] Field of Search ............... 358/160, 168, 169, 174; 307/350, 351

[56] References Cited

U.S. PATENT DOCUMENTS

| 3,914,545 | 10/1975 | Engel | 178/7.5 |
| 4,212,032 | 7/1980 | Harford | 358/177 |
| 4,216,502 | 8/1980 | Fox | 358/176 |
| 4,599,643 | 7/1986 | Harlan | 358/74 |
| 4,751,577 | 6/1988 | Kawai | 358/174 |

OTHER PUBLICATIONS

J. C. Maillet, "Peak Detector", IBM TM Technical Disclosure Bulletin, vol. 19, No. 14, 1286, 9/76.

Primary Examiner—James J. Groody
Assistant Examiner—David E. Harvey
Attorney, Agent, or Firm—Joseph S. Tripoli; Peter M. Emanuel; Frederick A. Wein

[57] ABSTRACT

A very fast peak detector having feedback is presented. A first device charges a storage capacitor to a voltage proportional to the peak voltage of an incoming signal. A second device coupled to the first device in a feedback configuration further charges the storage capacitor with a charging current in addition to the charging current provided by the first device for more rapidly charging the storage capacitor to said voltage proportional to the peak voltage of a low duty cycle short duration incoming pulse. This detector is particularly applicable to a video system having peak luminance detection requirements.

12 Claims, 2 Drawing Sheets 4,937,670

PEAK DETECTOR WITH FEEDBACK

This is a continuation-in-part of Ser. No. 304,299 filed Jan. 31, 1989, now abandoned.

BACKGROUND

The present invention relates to signal processing in a video system, and more particularly, to a high speed detector for detecting peak voltages of short duration pulses having a low duty cycle.

In a television set or the like, there is often a problem that when contrast settings are set to a high level, there is "blooming" of small areas or "white spots" on the CRT display. While the beam limiter circuits sense the brightness of large portions of display area and reduce the scanning beam of the CRT accordingly, there is a substantial time delay from when the actual initial scanning of small portions of the screen is accomplished to when the beam limiter is actuated. This delay in actuation of the beam limiter results in small portions of the display, e.g., one or two horizontal lines, or even small portions of a single horizontal line, having excess contrast luminance which will show up as a blooming effect before the beam limiter can work.

The response time of prior art peak detectors are substantially slower than what is required for the detection of short duration pulses of the type described above. Accordingly, it is desirable to detect the brightness of small portions of the CRT display, possibly down to single pixels, which are represented in the luminance signal as short duration, low duty cycle pulses, and to rapidly reduce the contrast or luminance for such small portions of the display. Accordingly, it is further desirable to provide a peak detector having a very rapid response time in order to peak detect such low duty cycle, short duration pulses.

SUMMARY OF THE INVENTION

Briefly, the present invention concerns a peak detector for detecting the peak amplitude of a short pulse having a low duty cycle. The present peak detector uses a storage capacitor, wherein the storage capacitor is charged to a voltage proportional to the peak of the input signal by a first charging source. The amplitude of the first charging current of the first charging source is sensed by a second charging source which provides additional charging current to the storage capacitor by use of feedback. When the storage or peak detecting capacitor is close to a full charging voltage proportional to the input signals peak voltage, the first charging source will start to turn off thereby turning off the second charging source and breaking the feedback loop. In this manner, the storage capacitor when in a low charge state can be provided with a sudden large magnitude of charging current to permit rapid peak detection of a low duty cycle single pulse signal. This rapid peak detection can be used in video processing systems wherein excessive contrast of small portions of the display or signal are to be controlled and compensated for.

BRIEF DESCRIPTION OF THE DRAWINGS

For a better understanding of the present invention, reference may be had to the accompanying drawings wherein.

DETAILED DESCRIPTION OF THE PREFERRED EMBODIMENT

In video systems, situations often arise where small portions of a frame or field, e.g., portions of a line, a plurality of pixels, or even a single pixel are overly bright or intense such that said portions of a frame can saturate or overdrive devices later in the processing chain. Such saturation from overdriving can occur in a CRT whereby the overdriven portion of the display can cause blooming. Similarly, if the receiving apparatus is a tape system such as a VCR, the portion of the tape wherein the excess contrast portion of the picture would be recorded can be driven to saturation even if the tape system has automatic limiting circuitry. This is because either for a CRT display having beam limiting or for a recording system having an automatic gain control or the like, such peak limiting systems have a relatively long time constant for reducing gain and the time constant for normalizing gain is usually even longer. Accordingly, such slow acting signal limiting systems are inadequate for reacting to small portions of a frame or picture.

Thus, the very fast acting peak detector of the present invention is highly desirable for detection of small portions of a picture such as a single pixels or the like in comparison to the slower reacting detectors previously used in automatic gain control or beam limiter circuits.

Figure 1:
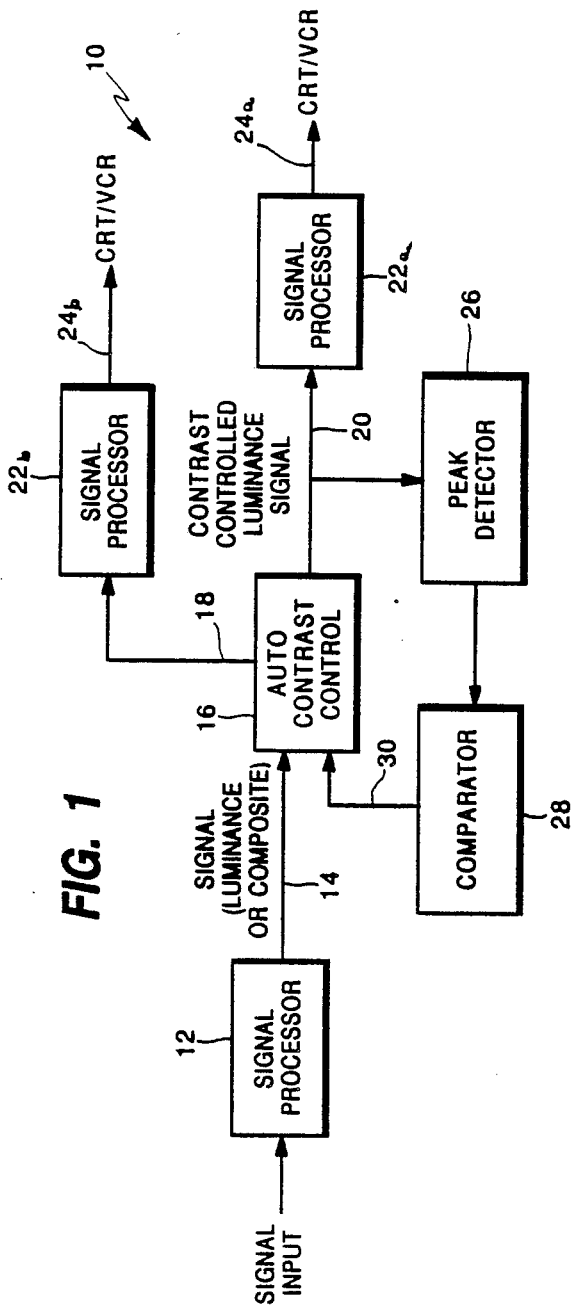
FIG. 1 is a block diagram of a video processing system of the present invention including a peak detector.

Referring now to the drawings, wherein like numerals are applied to like members, FIG. 1 shows one embodiment of a video processing system, generally designated 10, wherein a signal input is applied to a signal processor 12. Signal processor 12 can be any appropriate signal processor such a tuner and/or I-F of a television set or an amplifier, or any other appropriate video processor system of a kind common in the art. The output 14 of signal processor 12 can be a signal having contrast display information such as a video luminance signal or a video composite signal having luminance and chroma information. Signal 14 is fed to a contrast control circuit 16 which can be any appropriate circuit which can operate on the luminance signal only or is capable of independently processing both the luminance and chroma signals. In the exemplary embodiment, the contrast control circuit 16 has a chroma output 18 and a contrast controlled output 20 wherein the luminance only signal which is contrast controlled is available. The contrast controlled luminance signal and the chroma signal are further processed by respective signal processors 22a and 22b which can be any appropriate signal processor common in the art for processing luminance and chrominance signals. Output signals at 24a and 24b are then fed to a CRT or the like for display, or to recording heads of a VCR or the like for recording, or to any other appropriate device or signal processor.

As explained hereinabove, it is desirable to control the maximum contrast or intensity of very small portions of a signal and such processing of small portions of a signal requires a very fast response time, faster than, e.g., the conventional beam limiting circuitry of a television set.

The signal 20, which is the output of the contrast control circuit 16 and is a contrast controlled luminance signal, is peak detected in peak detector 26. The output signal of peak detector 26 is fed to a comparator 28 which can be any appropriate comparator circuit common in the art. Comparator 28 compares the output signal of peak detector 26 against a predetermined threshold level corresponding to the desired maximum instantaneous intensity to determine whether or not the detected peak of the short duty cycle at 20 is greater than the predetermined threshold. If the output signal of the peak detector 26 is higher than the predetermined threshold, then a signal output 30 from comparator 28 is fed to the contrast control circuit 16 which can be, for example, a gain controlled amplifier, the gain of which is controlled by a bias voltage, or any other appropriate signal processor which can be used for reducing the forward gain in a signal path such as an operational amplifier, or the like.

Luminance signals of the order of one line or less, or even one or two pixels, are represented by very short duration small duty cycle pulses requiring peak detection to a frequency of about 4.3 MHz. For short duty cycle pulses, it is necessary that the memory or storage capacitor be fully charged to a voltage proportional to the peak voltage of a single pulse which represents the luminance level of that one pixel. Accordingly, for a peak detector to accurately detect the peak voltage of a singly occurring short duty cycle pulse, the charging capacitor must be charged rapidly and accurately corresponding to the peak level of the incoming signal.

Figure 2:
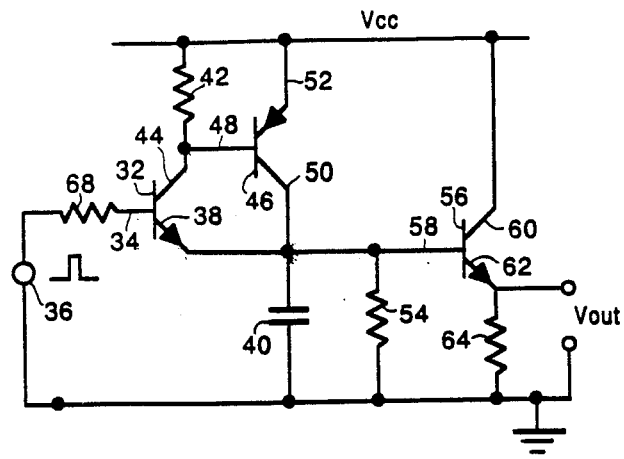
FIG. 2 is a schematic of one embodiment of the peak detector of FIG. 1.

Referring now to FIG. 2 there is shown one embodiment of a peak detector constructed in accordance with the invention which includes, a first transistor 32 which in the present embodiment is an NPN type, having a base 34 coupled for receiving an input signal from source 36, and an emitter 38 coupled to storage capacitor 40 for receiving and storing a voltage proportional to the peak of the pulse signal supplied from source 36 to base 34. Current from emitter 38 is substantially the same current as passing from collector 44 of transistor 32 through a load 42 which in the exemplary embodiment is a resistor coupled to an appropriate power supply voltage Vcc. When a positive peak voltage is applied to base 34 of transistor 32, transistor 32 will conduct current from collector 44 through emitter 38 and charge capacitor 40 provided that the voltage already on capacitor 40 is lower than the peak voltage of the incoming pulse 36 less the $V_{be}$ of transistor 32. If current does flow through the collector-emitter path of transistor 32, a voltage will be developed across load 42.

A transistor 46 which in the exemplary embodiment is a PNP type and of an opposite polarity type from transistor 32 which is an NPN, is coupled to transistor 32 with its base 48 coupled to the junction between collector 44 and load resistor 42. Collector 50 of transistor 46 is in turn coupled to capacitor 40 for charging capacitor 40 with current provided through emitter 52 which is coupled to power supply voltage Vcc. Transistors 32 and 46 are connected in a feedback configuration which will be discussed more fully hereinafter.

If current does flow through transistor 32, a voltage will be developed across load resistor 42 will overcome the $V_{be}$ of transistor 46 and thereby turn "on" transistor 46. The collector current of transistor 46 will then add to the emitter current of transistor 32 in charging capacitor 40 and in this way hasten the charging of capacitor 40. The amount of charging current delivered by transistor 46 can be adjusted from a small percentage of the charging current contributed by transistor 32 up to the current supply limits of the power supply and of transistor 46 which can amount to many times the charging current provided by transistor 32. The amount of current through transistor 46 is dependent upon the value of load resistor 42 for a particular charging current through transistor 32 and will be discussed more thoroughly hereinafter. The combined charging currents from transistors 32 and 46 charge capacitor 40 until the voltage developed across capacitor 40 is approximately the peak voltage of the input signal less the $V_{be}$ of transistor 32. At that time transistor 32 will start to turn "OFF". The collector and emitter currents of transistor 32 will then decrease towards zero and transistor 46 will rapidly turn "off" as the voltage generated across load resistor 42 rapidly decrease toward zero thus removing the bias applied to the base of transistor 46. In this manner, the voltage across capacitor 40 is rapidly brought to a voltage close to and proportional to the final peak detected voltage of the pulse supplied from source 36. In the exemplary embodiment, the voltage developed across capacitor 40 would be approximately the peak voltage of the input signal minus the $V_{be}$ of transistor 32. The collector current of transistor 32 and the resistance of resistor 42 determine the base-emitter voltage at transistor 46 and accordingly, how hard transistor 46 will be driven "on".

The value of load resistor 42 is chosen to determine when transistor 46 will start to conduct, how strongly it will conduct or even saturate, and when it will be turned "off". The values of load 42 and collector current of transistor 32 can be chosen so that transistor 46 will turn off just before the final voltage across capacitor 40 is reached with the final portion of charging provided only by transistor 32.

A resistor 54 is optional and can be connected in parallel with capacitor 40 to control the discharge rate of capacitor 40 and, to a slight extent, to change the charge rate in capacitor 40. A transistor 56 configured as an emitter-follower, has its base 58 coupled to capacitor 40, collector 60 coupled to an appropriate Vcc, and emitter 62 connected to ground through an appropriate resistor 64. Emitter-follower configured transistor 56 is not necessary for peak detection with feedback, however, it minimizes the effect of the loading by the following stages. When the emitter follower is used, the emitter follower transistor 56 forms part of the discharge time constant by means of its input impedance in parallel with resistor 54.

Figure 3:
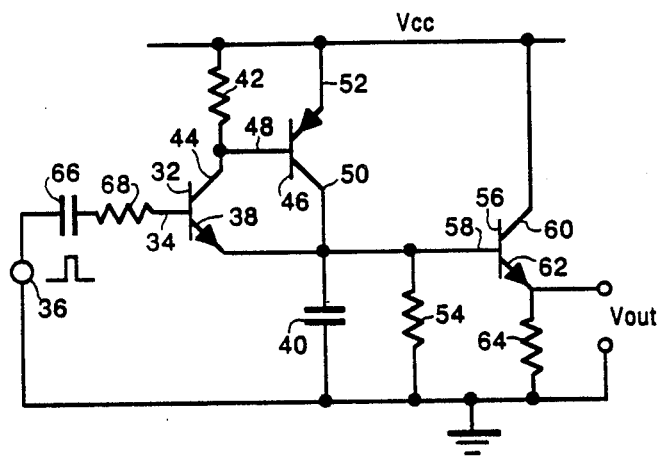
FIG. 3 is another embodiment of the peak detector of FIG. 1.

FIG. 3 shows an alternate embodiment of the peak detector of FIG. 2 wherein base 34 is AC coupled to source 36 through capacitor 66 whereas in FIG. 2 base 34 is DC coupled to source 36 through resistor 68. Resistor 68 can be physically present or can be part of the source impedance of source 36 or a combination of both. With reference to FIG. 2, capacitor 40 will charge up to a voltage proportional to the amplitude of the input pulse in addition to the DC level present at base 34. In FIG. 3, coupling capacitor 66 prevents any DC from the source 36 from reaching base 34, and accordingly capacitor 40 will charge up to a voltage proportional to the peak of the pulse 36 excluding any DC level which may be present at source 36. It should be noted that in the exemplary embodiments of both FIGS. 2 and FIG. 3, transistor 32 is not forward biased, and accordingly any detected final voltage at capacitor 40 will be lower than the peak of any pulse plus any DC level thereof by the $V_{be}$ voltage drop of transistor 32, which commonly for a silicon device, is approximately 0.5 volts.

With reference to FIGS. 2 and 3, transistors 32 and 46 are connected in a feedback configuration. There is a double signal inversion between base 34 of transistor 32 and collector 50 of transistor 46. The output of transistor 46 at collector 50 is connected in phase with the output from emitter 38 of transistor 32 with the in phase output of transistor 50, divided by the beta of transistor 32 plus one being reflected in phase to base 34. Thus transistors 32 and 46 form a feedback loop.

The feedback loop is broken when the base emitter diode of transistor 32 is close to a stopping of conduction and in turn the feedback loop is further broken when the voltage drop across load 42 further decreases causing the base emitter diode of transistor 46 to stop conducting. Thus, the feedback loop permits very rapid charging of capacitor 40 and, by the interaction between transistors 32 and 56, assures that capacitor 40 will not charge to a voltage larger than the peak voltage of the incoming signal from source 36. The value of resistor 42 can be further chosen to adjust the gain of the feedback configuration thus adjusting when and the amount of current transistor 46 will contribute to enhance the charging capacity of transistor 32. For example, if load resistor 42 is selected to be a relatively large value, transistor 46 will be turned "on" very hard and draw substantial amounts of current only limited by its saturation current capabilities, supply current capabilities of the power supply, and any resistance in the collector-emitter circuit of transistor 46. It is anticipated that transistor 46 in most cases will not be saturated inasmuch as the recovery time and hence the frequency response of the circuit would be reduced if transistor 46 was turned "on" to a saturation condition.

It can be seen that the charging current provided to capacitor 40 by transistor 32 is dependent upon the input current at base 34 and the beta of transistor 32. However, when transistor 46 is turned "on" the current available to charge capacitor 40 becomes substantially greater than that available from transistor 32 alone. Accordingly, the capacitor 40 can be charged at a much more rapid rate.

It should be noted that transistors 32 and 46 are of an opposite polarity from each other. In the exemplary embodiment shown in FIGS. 2 and 3, transistor 32 is an NPN and transistor 46 is a PNP coupled in the positive feedback configuration shown. For the embodiment shown in FIGS. 2 and 3, the power supply Vcc will then be a positive voltage and the input pulse detected from source 36 is a positive going pulse. It should be evident to those skilled in the art, that by changing the power supply to a negative voltage and reversing transistor types, e.g., transistor 32 being a PNP and transistor 46 being an NPN, that the circuits of FIGS. 2 and 3 then become a peak detector for a negative incoming pulse. With such changes in polarity, an appropriate change of transistor type polarity for transistor 56 can be instituted. It should also be noted that if both a positive pulse peak detector and a negative pulse peak detector are desirable, then the circuits of FIGS. 2 and 3 can be used for positive pulse detection and the circuits of FIGS. 2 and 3 with transistor polarities reversed can be used for a negative pulse peak detection.

It should also be noted that for the AC coupling of FIG. 3, the positive detection with feedback discussed herein will create a DC voltage at the output and across capacitor 40 which is independent of the DC offset voltage of a positive peak pulse voltage received from source 36.

Figure 4:
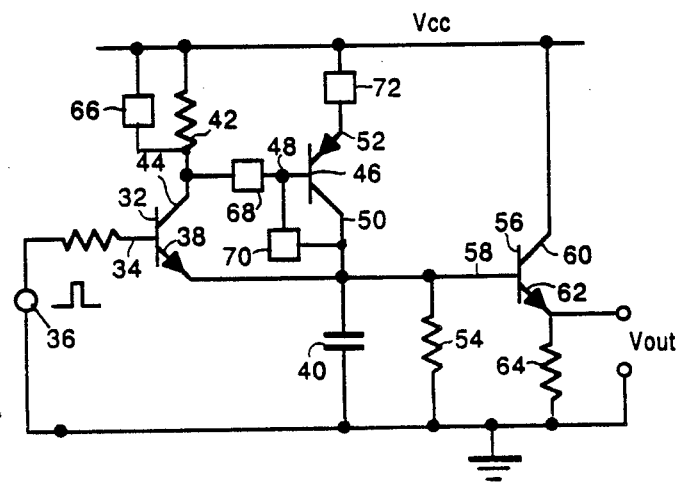
FIG. 4 is a schematic of frequency compensation that can be used for the embodiments of the peak detectors shown in FIGS. 2 and 3.

Referring now to FIG. 4 there is shown a variation of the circuits of FIGS. 2 and 3 with frequency compensation networks 66, 68, 70, and 72 shown in block diagram form. The frequency compensation networks discussed hereinafter for detection of positive voltage pulses are equally applicable to the negative pulse detecting configurations of FIGS. 2 and 3 as discussed hereinabove.

As stated hereinbefore, the frequency response of the circuits shown extend at a minimum up to 4.3 MHz and it is possible to have oscillation when the transistors 32 and 46 are in the "ON" state both due to their beta's, lead dress, and because transistors 32 are 46 are wired in a feedback configuration. Accordingly, to prevent such parasitic oscillation from occurring, it can be desirable to insert frequency compensation networks such as is shown in block diagrams 66, 68, 70 and 72 in order to partially roll off the high frequency response. For example, frequency compensation network 66 can be a capacitor of appropriate value to reduce the gain at high frequencies of transistor 32, or a capacitor in series with the resistor as appropriate. The frequency compensator 68 can comprise a pair of series resistors with a capacitor at the junction of the two resistors coupled to ground for reducing the forward loop gain at high frequencies. Additionally, frequency compensation network 70 can comprise a capacitor or an appropriate R-C network, and frequency compensation network 72 can comprise a resistor for reducing the gain of the transistor 46. It is to be understood that it is intent of the present invention that frequency compensation networks 66, 68, 70 and 72 can be any appropriate frequency selective or compensating network such as low pass, bandpass, Butterfield, etc.

In the exemplary embodiment, load resistor 42 is shown to be a resistor It is within the contemplation of the present invention that load 42 can be other than a resistor, e.g., a diode, or if the frequency of the incoming signal from source 36 is high enough, an inductor can be used.

In the exemplary embodiment, bipolar transistors are shown. It is within the contemplation of the present invention that devices other than bipolar transistors can be used, by example and not by limitation, field effect transistors or any other devices having the requisite characteristics.

It should also be noted that the exemplary embodiment and discussion thereof is directed to peak detection of incoming pulses only because contrast information in a video system appears as a pulse. It is within the contemplation of the present invention that the present peak detector is also applicable to other wave shapes such as sine waves, and that the present peak detector will detect the peaks of such other waveshapes. In this regard, the present peak detector serves quite well as a detector in an amplitude modulated receiver having an IF frequency of 455 KHz with the peak detector detecting the envelope of the carrier.

Thus, there has been disclosed a peak detector for rapidly detecting the peak of short duration low duty cycle pulses. Said peak detector uses feedback for augmenting and enhancing the charging of capacitor 40 and greatly reducing the charging time of the storage capacitor.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed is:

1. A peak detector for detection of the peak amplitude of an incoming signal comprising:
    a first transistor of a first polarity type having a first base for receiving the incoming signal, a first emitter, and a first collector,
    a storage capacitor coupled to the first emitter for receiving a first charging current from the first emitter for charging to a voltage proportional to the peak voltage of the incoming signal, a portion of the first charging current flowing through the first collector,
    a load coupled to the first collector,
    a second transistor of a second polarity type complementary to the first polarity type of the first transistor and having a second base, a second emitter, and a second collector, the second base coupled to the first collector for sensing the amplitude of the current flowing through the first collector, and the second collector coupled to the storage capacitor for further charging the storage capacitor to said voltage proportional to the peak voltage of the incoming signal with a second charging current in addition to the first charging current provided to the storage capacitor by the first transistor, and
    a parasitic oscillation prevention means coupled to at least one of the load, the second base and second emitter, the second emitter, and the second base.

2. The peak detector of claim 1 wherein the first base of the first transistor is direct coupled to an incoming signal source and the amplitude of the voltage developed at the storage capacitor includes the amplitude of the DC level of the incoming signal.

3. The peak detector of claim 1 wherein the first base of the first transistor is AC coupled to an incoming signal source and the amplitude of the voltage developed at the storage capacitor excludes the DC level of the incoming signal.

4. The peak detector of claim 1 further comprising a discharge path coupled across the storage capacitor, said discharge path having a discharge time constant longer than the charge time constant for the storage capacitor.

5. The peak detector of claim 4 wherein the discharge path comprises an input impedance of an emitter follower for outputting the detected peak voltage.

6. The detector of claim 1 wherein the load comprises at least one of a diode, a resistor, and an inductance.

7. A video system having a peak detector comprising:
    a signal processing means for receiving a video signal and processing the signal, said signal including contrast display information, and
    a means for processing the contrast display information for controlling the maximum luminance intensity of a portion of the signal, said means including a peak detector comprising:
    a first transistor of a first polarity type having a first base for receiving the incoming signal, a first emitter, and a first collector,
    a storage capacitor coupled to the first emitter for receiving a first charging current from the first emitter for charging to a voltage proportional to the peak voltage of the incoming signal, a portion of the first charging current flowing through the first collector,
    a load coupled to the first collector,
    a second transistor of a second polarity type complementary to the first polarity type of the first transistor and having a second base, a second emitter, and a second collector, the second base coupled to the first collector for sensing the amplitude of the current flowing through the first collector, and the second collector coupled to the storage capacitor for further charging the storage capacitor to said voltage proportional to the peak voltage of the incoming signal with a second charging current in addition to the first charging current provided to the storage capacitor by the first transistor, and
    a parasitic oscillation prevention means coupled to at least one of the load, the second base and second emitter, the second emitter, and the second base.

8. The video system of claim 7 wherein the first base of the first transistor is direct coupled to an incoming signal source and the amplitude of the voltage developed at the storage capacitor includes the amplitude of the DC level of the incoming signal.

9. The video system of claim 7 wherein the first base of the first transistor is AC coupled to an incoming signal source and the amplitude of the voltage developed at the storage capacitor excludes the DC level of the incoming signal.

10. The video system of claim 7 further comprising a discharge path connected across the storage capacitor, said discharge path having a discharge time constant longer than the charge time constant for the storage capacitor.

11. The system of claim 10 wherein the discharge path comprises an input impedance of an emitter follower for outputting the detected peak voltage.

12. The video system of claim 7 wherein the load comprises at least one of a diode, a resistor, and an inductance.

* * * * *